No. 880,438. PATENTED FEB. 25, 1908.
R. J. BROOKS.
FEED BAG.
APPLICATION FILED JULY 18, 1907.
2 SHEETS—SHEET 1.
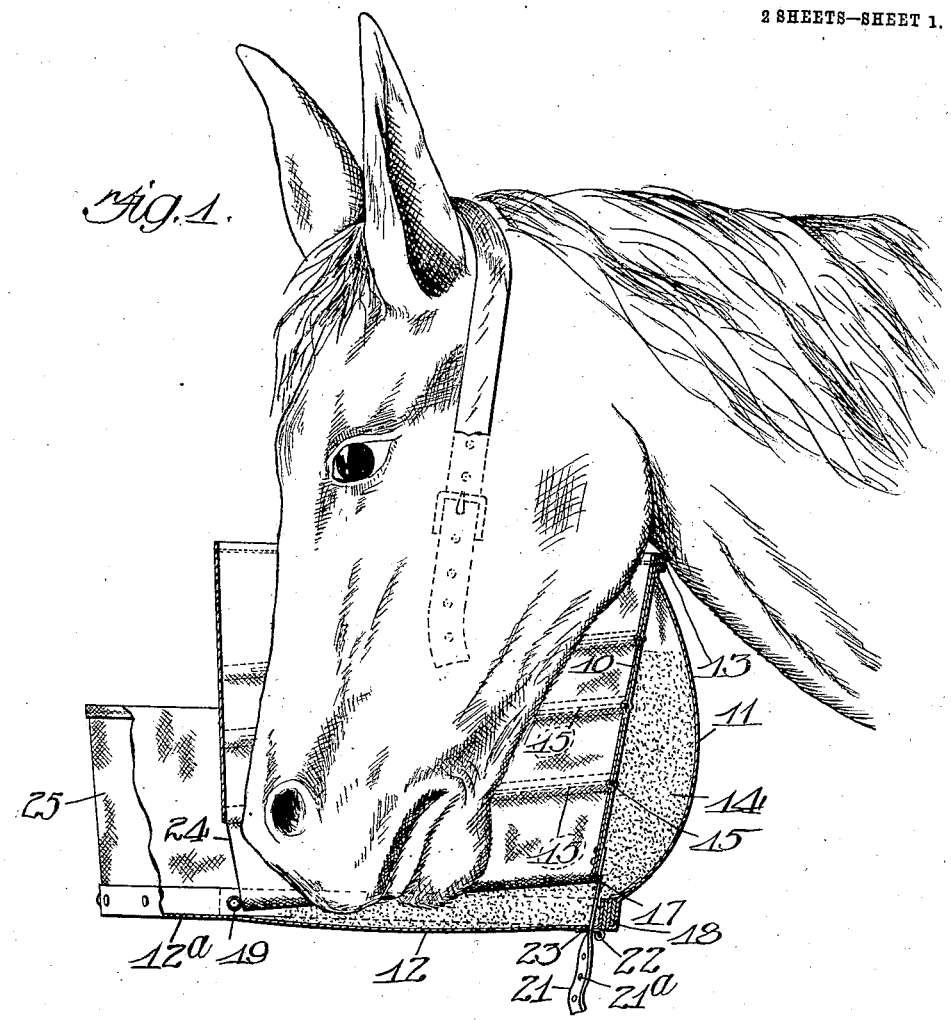
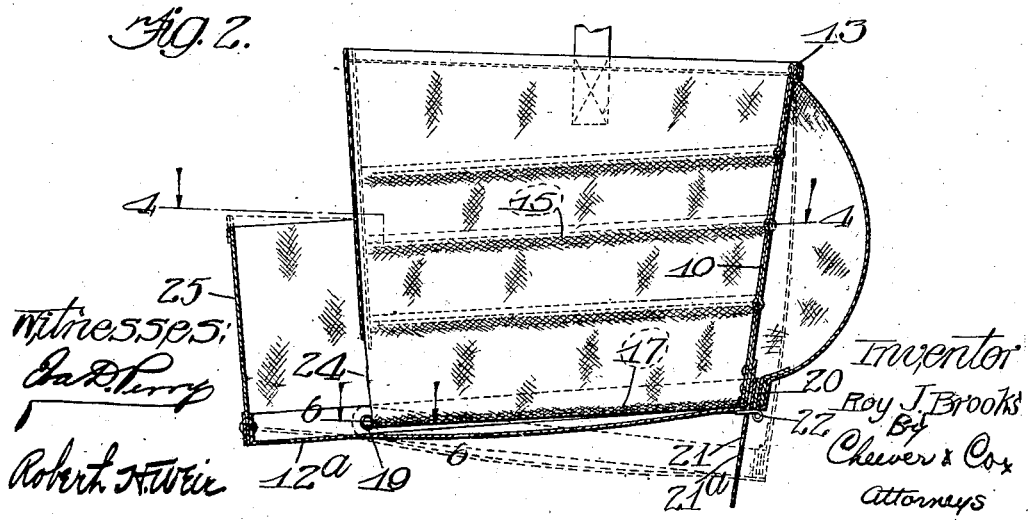

No. 880,438. PATENTED FEB. 25, 1908.
R. J. BROOKS.
FEED BAG.
APPLICATION FILED JULY 18, 1907.
2 SHEETS—SHEET 2.
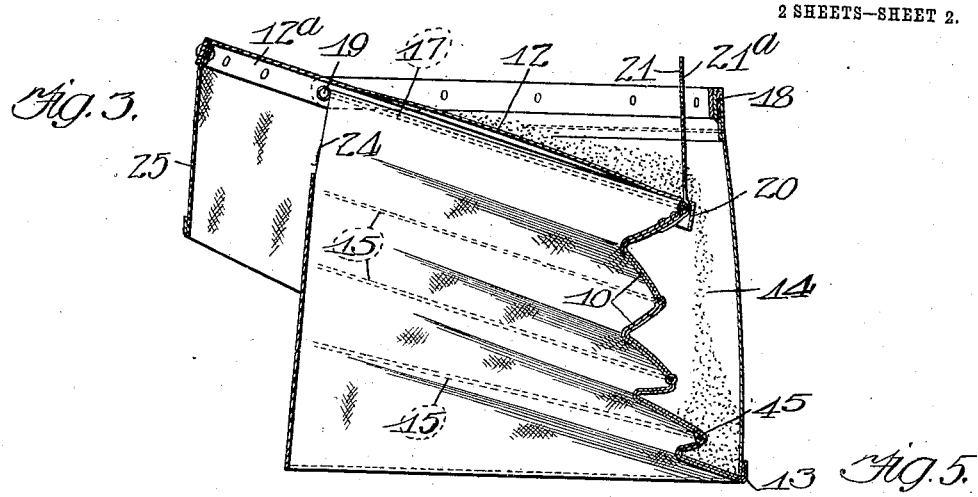
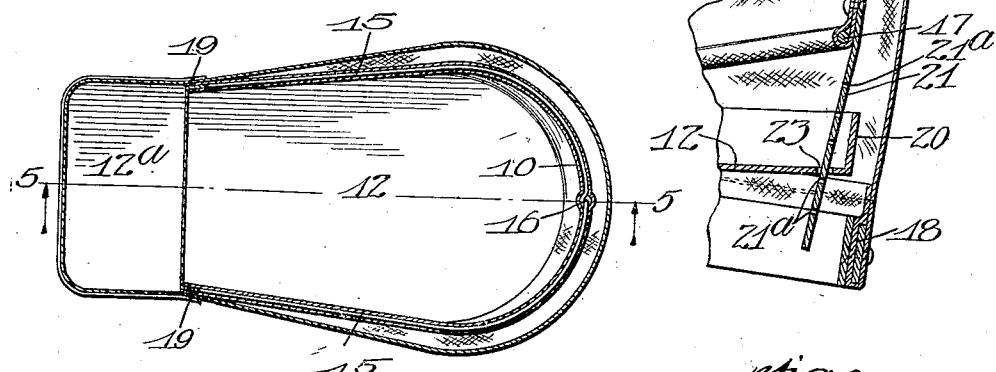
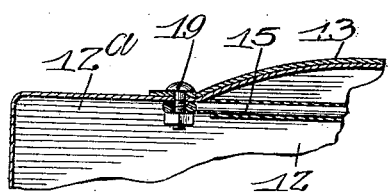
Witnesses:
Inventor
Roy J. Brooks
By Cheever & Cox
Attorneys

UNITED STATES PATENT OFFICE.

ROY J. BROOKS, OF CASSOPOLIS, MICHIGAN.

FEED-BAG.

No. 880,438.  Specification of Letters Patent.  Patented Feb. 25, 1908.

Application filed July 18, 1907. Serial No. 384,320.

*To all whom it may concern:*

Be it known that I, ROY J. BROOKS, a citizen of the United States, residing at Cassopolis, in the county of Cass and State of Michigan, have invented a certain new and useful Improvement in Feed-Bags, of which the following is a specification.

My invention relates to feed bags such for example as those used for feeding grain to horses.

The objects of the invention are: First, to provide a simple and convenient device in which grain may be stored without spilling when the device is not in use. Second, to provide a device of this class which shall not tend to cave in against the head of the animal when in use. Third, to provide a simple and efficient means for regulating the position of the bottom of the device with reference to the sides or walls thereof. Fourth, to provide a ventilation pocket so constructed that the animal may have plenty of air to breathe and yet will be prevented from scattering and wasting the grain; and fifth, to provide certain refinements of detail which render the device practical and convenient as hereinafter described.

I accomplish my objects by the device illustrated in the accompanying drawings, in which:

Figure 1 is a sectional elevation of the device shown in position upon the head of a horse. Fig. 2 shows the device in a relation similar to Fig. 1 and illustrates the possible relative positions of the inner and outer receptacles. Fig. 3 is a sectional elevation of the bag when placed upside down for filling it with grain. Fig. 4 is a plan section taken on line 4—4 Fig. 2. Fig. 5 is a fragmentary sectional elevation taken on line 5—5 Fig. 4. This figure illustrates the constructions of the lower edges of the inner and outer receptacles and the peripheral edge of the bottom. Fig. 6 is a fragmentary plan section taken on line 6—6 Fig. 2. Fig. 7 is a fragmentary detail showing the preferred manner of jointing the reinforcing ribs of the inner receptacle.

Similar numerals refer to similar parts throughout the several views.

This device consists primarily of two receptacles, an inner one 10, an outer one 11, and a valve-like bottom 12. These receptacles are preferably made of canvas or other flexible and durable material and although they may be formed of a single piece of fabric it is preferable for practical reasons to make them of different pieces sewed together at the upper edges for example at 13 Fig. 2. As usual in articles of this class, the device is adapted to be strapped or otherwise secured to the head of a horse or other animal. The outer receptacle 11 is considerably larger in diameter than the inner one, in consequence of which a pocket 14 is formed in the side of the device for the storage of grain or chopped feed. In the preferred form the pocket 14 does not extend entirely around the bag, but the front portion is made single. In order to prevent the collapsing of the inner receptacle against the head of the horse when the device is in use, reinforcing strips or ribs 15 are secured upon the inner bag in approximately horizontal position by means of stitching or otherwise. I prefer to make these ribs of wire formed in two pieces jointed as shown at 16 Figs. 4 and 7. The joint there shown consists of interengaged eyes, the idea being that with such construction the sides of the device may be brought somewhat closely together when the device is being transported, but will not bulge inwardly against the head of the animal when the latter is feeding. These ribs 15 are placed at some distance apart, three or four being a suitable number to be interposed between the upper and lower edges of the receptacle. By thus spacing them the bag may be collapsed or folded in a vertical direction for transportation. This construction also permits the inner receptacle to be more readily collapsed in the vertical direction to thereby facilitate the introduction of grain into the pocket 14 when the device is in inverted position and being charged or filled as indicated in Fig. 3. The inner and outer receptacles are provided with ribs 17 and 18 respectively for preserving the contour of these lower edges. The outer rib 18 should have considerable stiffness and may be made of a light gage of band iron as indicated for example in Fig. 5. The bottom 12 is hinged to these ribs 17 and 18 in any suitable manner for example the pins or rivets 19 best shown in Fig. 6. In its best form said bottom 12 is of metal and is provided with an upwardly extending marginal flange 20 (see Figs. 3 and 5) adapted to make a comparatively close fit on the outside of the lower edge of the inner receptacle and the inner edge of the outer receptacle. It is obvious that if thus constructed said bottom may make a tight closure with both the inner and outer receptacles.

The preferred means for holding the bottom 12 in proper position relatively to the lower edge of the inner receptacle is the strap 21 having a series of apertures 21ª through which a pin 22 may be inserted beneath the bottom 12. By preference the bottom has an aperture 23 through which strap 21 may pass.

It is desirable in devices of this kind to provide means for supplying air to the bottom of the bag to facilitate the animal's breathing. I accomplish this purpose by forming an extension 12ª at the front of the bag in front of an aperture 24 formed in the front lower portion of the bag as clearly shown in Figs. 1, 2 and 3. Around this opening, and extending upwardly from the edges of the extension 12ª is a pocket 25 made of canvas or other suitable material and extending to a height considerably higher than the upper edge of the opening 24. It is advantageous although not essential, that the height of the pocket 25 should be at least twice the height of the opening 24 and should be approximately half the total height of the entire device. In consequence of this construction the animal has a plentiful supply of air through the opening 24 and pocket 25 but he cannot by the tossing of his head in the ordinary manner throw the grain entirely out of the pocket.

In the operation of the device, when it is desired to introduce a supply of grain, the device is turned upside down and the bottom 12 is permitted to drop below the rib 18 so as to leave an opening through which the grain may be introduced into the pocket 14 between the inner and outer receptacles. The relation of the parts at this time is clearly indicated in Fig. 3. After the bag has received the desired amount of feed the bottom 12 is brought to closed position so that the flange 20 is in proximity to the rib 18. The device may then be turned right side up, when the parts will occupy the position shown in full lines in Fig. 2. When it is desired to feed the animal the bag is strapped to its head in the usual manner, the grain being contained in the pocket 14 as illustrated in Fig. 1. The grain may now be gradually introduced into the inner side of the receptacle by pulling out the pin 22 and permitting the bottom 12 and rib 18 to descend until there is a proper distance between the rib 18 and 17. The pin 22 is then reinserted and the weight of the grain will hold the bottom 12 and the rib 18 as shown in Fig. 1. The opening into the interior of the bag may be increased or decreased by lowering or raising the bag bottom with reference to strap 21.

It is of special advantage that the flange 20 of the bottom 12 should fit inside of the rib 18 and outside of the rib 17 for by this construction the part 12 is co-extensive with the largest dimensions of the bottom of the device and there is no horizontal rim extending inward from the rib 18 to obstruct the passage or decrease the size of the opening. Moreover by fitting over the inner rib 17 the bottom 12 forms a perfect guide or chute for conveying the grain into the pocket 14 during the operation of charging, and there is no chance of leakage or spillage of the grain.

What I claim as new and desire to secure by Letters Patent, is:

1. A feed bag comprising an outer bag closed at the bottom and an inner bag open at the bottom, the bottom of the outer bag being provided with an aperture for a strap and adapted to drop below the lower edge of the inner bag thereby permitting the feed to pass from the outer bag to the inner one, a strap secured to the inner bag and passing through said aperture in the bottom of the outer bag, said strap being flexible to thereby permit the lower edges of the inner and outer bags to come together without readjustment of the strap and yet limit the distance to which said edges may move apart, and means on the strap for regulating the position of the bag-bottom with reference to said strap.

2. A feed bag for animals comprising an inner and an outer part, adapted to store feed between them, said parts being open at the bottom, and a valve-like bottom part adapted to fit over the lower edge of the inner bag part when the device is being charged and adapted to fit within the lower opening of the outer bag part to form a bottom for the device when the animal is being fed.

3. A feed bag for animals comprising an inner and an outer part adapted to store feed between them, said parts being open at the bottom, a valve-like bottom part adapted to fit over the lower edge of the inner bag part when the device is being charged and adapted to fit within the lower opening of the outer bag part when the animal is being fed, and stiffeners secured to the inner bag part to prevent the inward caving thereof, said stiffeners running approximately horizontally and being located at some distance apart to permit the bag to collapse in a vertical direction.

4. A feed bag consisting of an inner and an outer receptacle which are open at the bottom, the outer receptacle being longer than the inner one so that its lower edge may drop below the lower edge of the inner receptacle, a rib secured to the lower edge of the outer receptacle for preserving the shape thereof, and a valve-like bottom hinged to said rib and adapted to fit within the same, substantially as described.

5. A feed bag consisting of an inner and an outer receptacle which are open at the bottom, the outer receptacle being longer than the inner one so that its lower edge may drop below the lower edge of the inner receptacle, a rib secured to the lower edge of the outer receptacle for preserving the shape thereof, and a valve-like bottom hinged to said rib and adapted to fit within the same, the lower edge of said inner receptacle being also provided with a rib and said valve-like bottom being adapted to fit over it for the purpose described.

In witness whereof, I have hereunto subscribed my name in the presence of two witnesses.

ROY J. BROOKS.

Witnesses:
 HOWARD M. COX,
 CLARA J. CHRISTOFFEL.